United States Patent
Desai (10) Patent No.: US 11,627,196 B2
(45) Date of Patent: *Apr. 11, 2023

(54) TRAFFIC MIRRORING (71) Applicant: eBay Inc., San Jose, CA (US)

(72) Inventor: Amit Desai, Fremont, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/824,486

(22) Filed: May 25, 2022

(65) Prior Publication Data

US 2022/0294872 A1 Sep. 15, 2022

Related U.S. Application Data (63) Continuation of application No. 16/227,529, filed on Dec. 20, 2018, now Pat. No. 11,375,032.

(51) Int. Cl.
| | |
|---|---|
| H04L 67/56 | (2022.01) |
| H04L 45/16 | (2022.01) |
| H04L 69/22 | (2022.01) |
| H04L 43/55 | (2022.01) |
| H04L 67/567 | (2022.01) |
| H04L 67/01 | (2022.01) |

(52) U.S. Cl.
CPC .............. H04L 67/56 (2022.05); H04L 43/55 (2022.05); H04L 45/16 (2013.01); H04L 67/567 (2022.05); H04L 69/22 (2013.01); H04L 67/01 (2022.05)

(58) Field of Classification Search
CPC ......... H04L 43/55; H04L 45/16; H04L 67/01; H04L 67/56; H04L 67/567; H04L 67/22
See application file for complete search history.

(56) References Cited

U.S. PATENT DOCUMENTS

| | | |
|---|---|---|
| 8,001,422 B1 | 8/2011 | Sun et al. |
| 8,155,118 B2 | 4/2012 | Jorgensen et al. |
| 8,799,714 B1 | 8/2014 | Guruswamy et al. |
| 9,047,251 B2 | 6/2015 | Suganthi et al. |
| 9,331,915 B1 | 5/2016 | Brandwine |
| 9,424,172 B1 | 8/2016 | Helder |
| 2004/0073811 A1 | 4/2004 | Sanin |
| 2007/0300240 A1 | 12/2007 | Viegener et al. |
| 2013/0174126 A1 | 7/2013 | Belihomji et al. |
| 2015/0095407 A1 | 4/2015 | Li et al. |
| 2016/0283348 A1 | 9/2016 | Golde et al. |

(Continued)

OTHER PUBLICATIONS

"Final Office Action", U.S. Appl. No. 16/227,529, dated Aug. 12, 2020, 10 pages.

(Continued)

Primary Examiner — Thomas J Dailey
(74) Attorney, Agent, or Firm — FIG. 1 Patents (57) ABSTRACT A system and method for mirroring traffic data is described. A traffic proxy samples traffic data between a client device and a first web server. The traffic data comprises requests from the client device and corresponding responses from the first web server. The sampled traffic data is encoded and relayed to a second web server. The second web server comprises an updated version of a web service that is operating at the first web server. Responses from the first web server are compared with responses from the second web server based on the requests in the encoded sampled traffic data. The differences between the responses from the first web server and the second web server is stored.

20 Claims, 6 Drawing Sheets

(56) References Cited

U.S. PATENT DOCUMENTS

| | | |
|---|---|---|
| 2016/0344759 A1 | 11/2016 | Zak et al. |
| 2017/0017650 A1 | 1/2017 | Ciabarra, Jr. et al. |
| 2019/0281134 A1 | 9/2019 | Suresh |
| 2020/0204636 A1 | 6/2020 | Desai |

OTHER PUBLICATIONS

U.S. Appl. No. 16/227,529, "Applicant Initiated Interview Summary Received for U.S. Appl. No. 16/227,529, dated May 11, 2020", May 11, 2020, 3 Pages.

U.S. Appl. No. 16/227,529, "Applicant Initiated Interview Summary Received for U.S. Appl. No. 16/227,529, dated Sep. 30, 2020", Sep. 30, 2020, 3 Pages.

U.S. Appl. No. 16/227,529, "Final Office Action Received for U.S. Appl. No. 16/227,529, dated Apr. 21, 2021", Apr. 21, 2021, 13 Pages.

U.S. Appl. No. 16/227,529, "Non Final Office Action Received for U.S. Appl. No. 16/227,529, dated Feb. 21, 2020", Feb. 21, 2020, 9 Pages.

U.S. Appl. No. 16/227,529, "Non Final Office Action Received for U.S. Appl. No. 16/227,529, dated Jan. 21, 2021", Jan. 21, 2021, 10 Pages.

U.S. Appl. No. 16/227,529, "Non-final Office Action received for U.S. Appl. No. 16/227,529, dated Sep. 15, 2021", Sep. 15, 2021, 14 Pages.

U.S. Appl. No. 16/227,529, "Notice of Allowance received for U.S. Appl. No. 16/227,529, dated Mar. 11, 2022", Mar. 11, 2022, 8 Pages.

U.S. Appl. No. 16/227,529, "Response to Final Office Action filed on Oct. 5, 2020 for U.S. Appl. No. 16/227,529, dated Aug. 12, 2020", Oct. 5, 2020, 13 Pages.

U.S. Appl. No. 16/227,529, "Response to Non-Final Office Action Filed on May 20, 2020, for U.S. Appl. No. 16/227,529, dated Feb. 21, 2020", May 20, 2020, 16 pages.

Hashemi, "Push our limits—reliability testing at Twitter", https://blog.twitter.com/engineering/en_us/a/2014/push-our-imits-reliability-testing-at-twitter.html, Sep. 20, 2014, 8 Pages.

Hilton, "*CRE life lessons: What is a dark launch, and what does it do for me?*", https://cloud.google.com/blog/products/gcp/cre-life-lessons-what-is-a-dark-launch-and-what-does-it-do-for-me, Aug. 3, 2017, 6 Pages.

Posta, "Advanced Traffic-Shadowing Patterns for Microservices With Istio Service Mesh", Retried from the Internet URL: <https:1/bl og. christi anposta. com/m icroservi ces/advanced-traffic-shadowing-patterns-for-m i croservi ces-wi tit-i sti o-servi ce-m eshl>, Accessed on Mar. 19, 2019, 17 Pages.

Posta, "Traffic Shadowing With Istio: Reducing the Risk of Code Release", Retrieved from the Internet URL: <https://blog.christianposta.com/microservices/traffic-shadowing-with-istio-reduce-the-risk-of-code-release/>, Accessed on Mar. 19, 2019, 11 Pages.

Sridharan, "Testing in Production, The Safe Way", Retrieved from the Internet URL: <https://medium.com/@copyconstruct/testing-in-production-the-safe-way-18ca102d0ef1>, Mar. 25, 2018, 28 Pages.

| REGEX CONDITION GROUP TEMPLATES | DESCRIPTION (REGEX SEARCH IN) |
|---|---|
| \REQ_B\{REGEX} && \RES_H\{REGEX} | REQUEST BODY AND RESPONSE HEADER |
| \REQ_B\{REGEX} \|\| \RES_H\{REGEX} | REQUEST BODY OR RESPONSE HEADER |

TRAFFIC MIRRORING

RELATED APPLICATION

This application is a continuation of and claims priority to U.S. patent application Ser. No. 16/227,529, filed Dec. 20, 2018, entitled "Traffic Mirroring", the disclosure of which is hereby incorporated by reference in its entirety.

TECHNICAL FIELD

The subject matter disclosed herein generally relates to a special-purpose machine that mirrors traffic data, including computerized variants of such special-purpose machines and improvements to such variants. Specifically, the present disclosure addresses systems and methods that detect differences between different versions of web services.

BACKGROUND

Web service (also referred to as web applications) are subject to a quality assurance process prior to production (e.g., live version on a server). However, the quality assurance tests may not be sufficient because new features of the web service can only be tested using real production data using the live version on the server. Many scenarios can only occur in a production environment. As such, errors or production bugs may still exist in the live production version of the web service. To address this, web services can be deployed in a controlled fashion (e.g., a few machines at a time, or using a beta version on select beta testers). However, the implementation of a roll out method with a few machines at a time or with a limited set of beta testers can be time consuming and cumbersome.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Computer-Readable Medium" refers to both machine-storage media and transmission media. Thus, the terms include both storage devices/media and carrier waves/modulated data signals. The terms "machine-readable medium,"

"computer-readable medium" and "device-readable medium" mean the same thing and may be used interchangeably in this disclosure.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Usually, production web services have either a proxy or service mesh in front of them. These may be implemented on the same machine. A traffic mirroring module can be part of this proxy to relay the mirrored traffic to a predefined destination, for example, a shadow production machine (that does not serve users of the original web service), also referred to as a pre-production cluster. Furthermore, the proxy provides for fuzzy sampling of traffic data between a client device and the production web service by filtering request/response body/headers or URL patterns.

The proxy sitting on a live web production cluster relays traffic to the pre-production cluster after the proxy has processed current requests from the client device. Another proxy resides at the pre-production cluster to evaluate a request against a new version of a web service. The proxy at the pre-production cluster determines differences between responses from the original version of the web service at the live web production cluster and the new version of the web service at the pre-production cluster. A monitor receives the differences and provides alerts based on the differences.

The present application describes a system and method for testing a new version of the web service against live production traffic and for automatically reporting differences compared to previous version of the web service. In one example embodiment, the system samples traffic data between a client device and a first web server. The traffic data comprises requests from the client device and corresponding responses from the first web server. The sampled traffic data are encoded and relayed to a second web server. The second web server has an updated version of a web service that is operating at the first web server. The system compares responses from the first web server with responses from the second web server based on the requests in the encoded sampled traffic data. The system stores differences between the responses from the first web server and the second web server.

Figure 1:
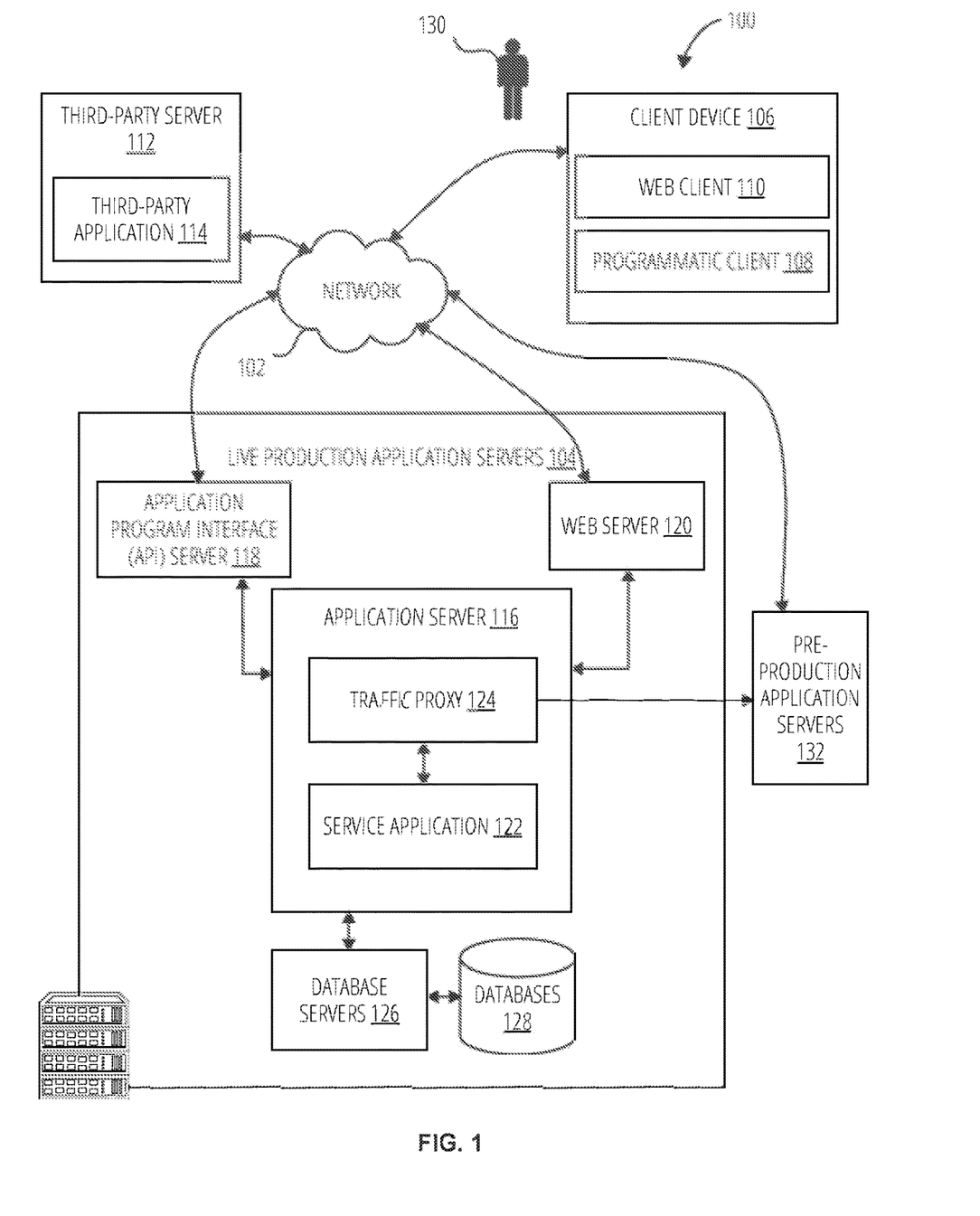
FIG. 1 is a diagrammatic representation of a networked environment in which the present disclosure may be deployed, in accordance with some example embodiments.

As a result, one or more of the methodologies described herein facilitate solving the technical problem of testing on a live production web services. As such, one or more of the methodologies described herein may obviate a need for certain efforts or computing resources that otherwise would be involved in controlled roll out of the live production web services over several machines at a time. As a result, resources used by one or more machines, databases, or devices (e.g., within the environment) may be reduced. Examples of such computing resources include processor cycles, network traffic, memory usage, data storage capacity, power consumption, network bandwidth, and cooling capacity. For example, by monitoring for any differences in production, fewer machines may be involved in the initial deployment. Further still, one embodiment allows for selective comparison of differences in web server results, which reduces computing resources that would be required to monitor and compare differences of all responses FIG. 1 is a diagrammatic representation of a network environment 100 in which some example embodiments of the present disclosure may be implemented or deployed. One or more live production application servers 104 provide server-side functionality via a network 102 to a networked user device, in the form of a client device 110. A web client 110 (e.g., a browser) and a programmatic client 108 (e.g., an "app") are hosted and execute on the web client 110.

An Application Program Interface (API) server 118 and a web server 120 provide respective programmatic and web interfaces to live production application servers 104. A specific application server 116 hosts a service application 122, which includes components, modules and/or applications.

The service application 122 may provide a number of functions and services to users who access the live production application servers 104 though a traffic proxy 124. The traffic proxy 124 may intercept traffic data between the client device 106 and the service application 122. The traffic proxy 124 may relay the intercepted traffic data to the pre-production application servers 132. The pre-production application servers 132 includes a service application (not shown) with a version (e.g., new version) different than the version of the service application 122.

While the service application 122 and the traffic proxy 124 are shown in FIG. 1 to both form part of the live production application servers 104, it will be appreciated that, in alternative embodiments, the traffic proxy 124 and service application 122 may reside on different machine.

Further, while the network environment 100 shown in FIG. 1 employs a client-server architecture, the embodiments are, of course, not limited to such an architecture, and could equally well find application in a distributed, or peer-to-peer, architecture system, for example. The service application 122 and traffic proxy 124 could also be implemented as standalone software programs, which do not necessarily have networking capabilities.

The web client 110 accesses the various service application 122 through the traffic proxy 124 via the web interface supported by the web server 120. Similarly, the programmatic client 108 accesses the various services and functions provided by the service application 122 and the traffic proxy 124 via the programmatic interface provided by the Application Program Interface (API) server 118. The programmatic client 108 may, for example, be a seller application (e.g., eBay Application developed by eBay Inc., of San Jose, Calif.) to enable sellers to author and manage listings on the network environment 100 in an offline manner, and to perform batch-mode communications between the programmatic client 108 and the live production application servers 104. Other seller applications or APIs may be hosted by AMAZON, ETSY, GOOGLE, WALMART, any other e-commerce company, or company with production web servers. Notably, API server 118 may offer a user application directly accessible as a web site and need not be accessed by a separate client application (or the programmatic client 108 is hosted in a client browser).

FIG. 1 also illustrates a third-party application 114 executing on a third-party server 112 as having programmatic access to the live production application servers 104 via the programmatic interface provided by the Application Program Interface (API) server 118. For example, the third-party application 114 may, utilizing information retrieved from the application server 116, support one or more features or functions on a website hosted by a third party. The third-party website may, for example, provide one or more promotional, marketplace, or payment functions that are supported by the relevant applications of the live production application servers 104.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
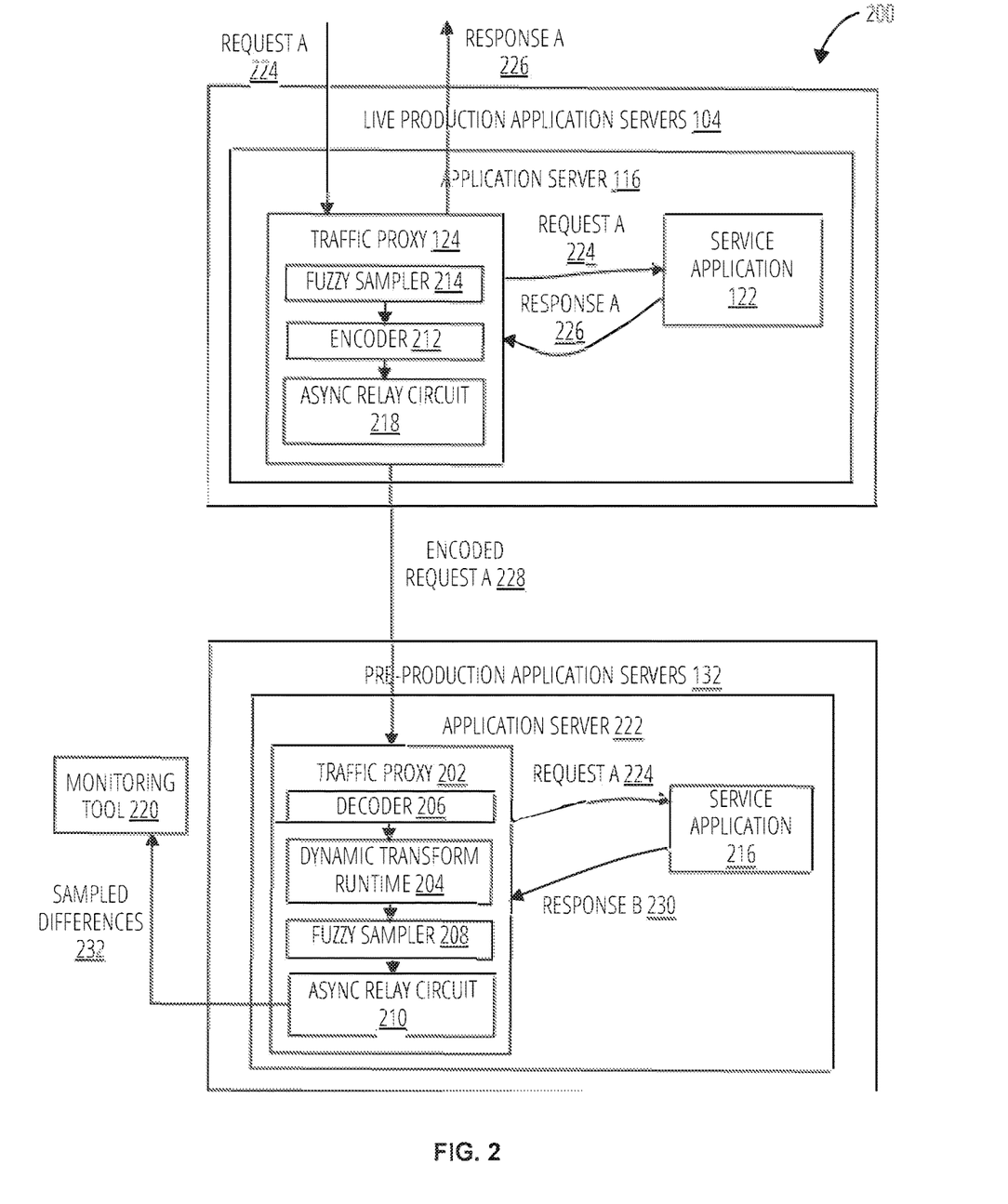
FIG. 2 illustrates a mirroring system in accordance with one embodiment.

FIG. 2 illustrates a mirroring system in accordance with one embodiment. The live production application servers 104 receives a request A 224 from the client device 106. The request A 224 is directed to the service application 122. The application server 116 includes the traffic proxy 124 and the service application 122. The traffic proxy 124 receives the request A 224 from the client device 106 and forwards the request A 224 to the service application 122. In another example embodiment, the traffic proxy 124 intercepts the request A 224 directed to the service application 122 and relays the request A 224 to the service application 122.

The service application 122 includes a current version of a service provided by the service application 122. The service application 122 generates a response A 226 in response to the request A 224 to the traffic proxy 124. The traffic proxy 124 sends the response A 226 back to the client device 106.

Figure 3:
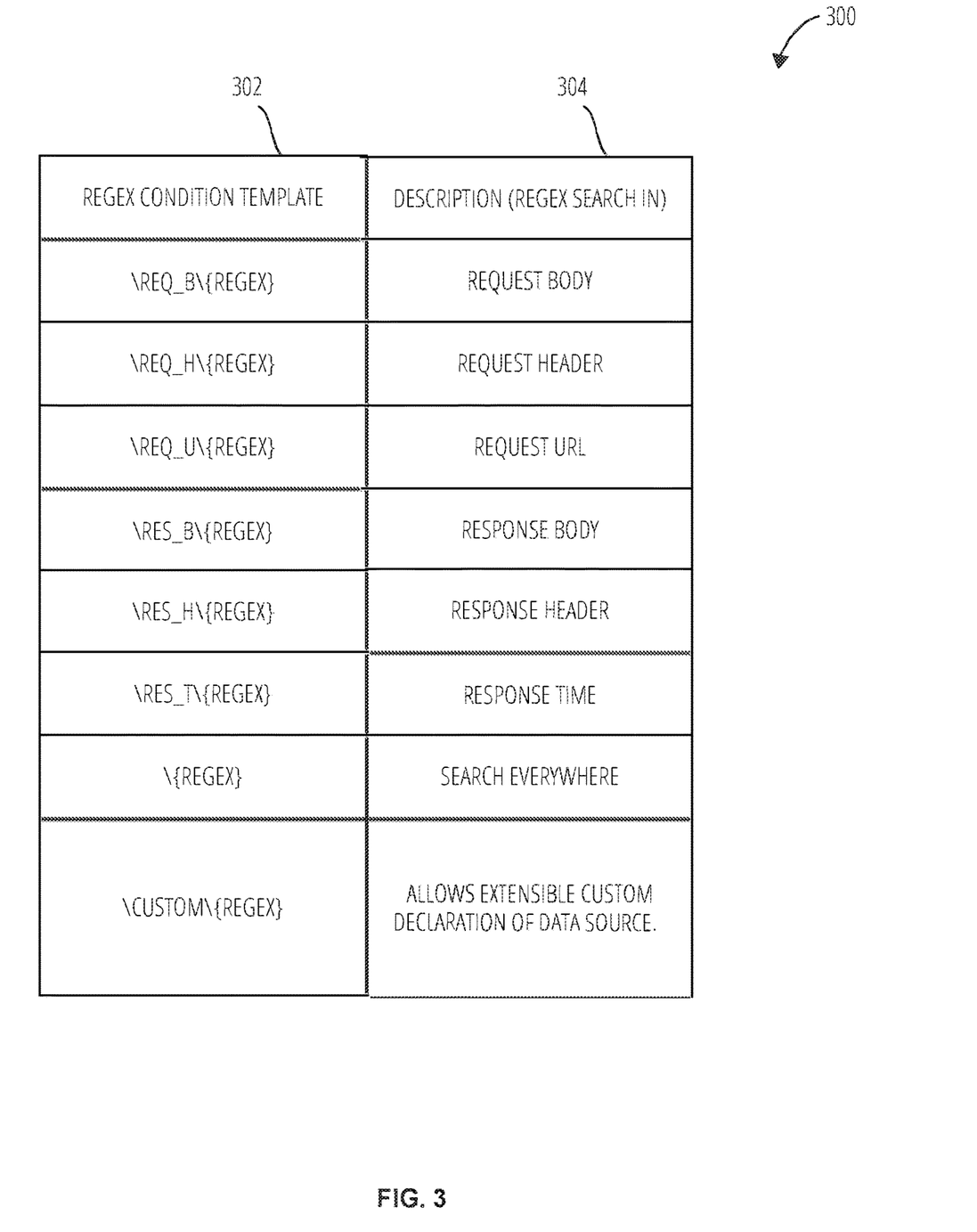
FIG. 3 illustrates a table 300 in accordance with one embodiment.

In one example embodiment, the traffic proxy 124 includes a fuzzy sampler 214, an encoder 212, and an async relay circuit 218. The fuzzy sampler 214 samples responses from the service application 122 for mirroring traffic to traffic proxy 202. The fuzzy sampler 214 filters traffic to be analyzed for differences at the front end of the traffic proxy 124. One technical effect of the front end of the traffic proxy 124 is reducing computing cycles by reducing traffic to be analyzed to that of interest. The fuzzy sampler 214 filters based on requests or responses of interests. For example, the fuzzy sampler 214 can filter based on a combination of request body, request header, request URL, response body, response header, and response time. In another example, the fuzzy sampler 214 filters based on a request body and a response header. The fuzzy sampler 214 can be dynamically configured at runtime and use regex pattern matching. FIG. 3 illustrates an example of a table of regex condition template 302 and corresponding descriptions 304. For example, \REQ_B\{regex} can be used to filter content from a request body.

The encoder 212 encodes sampled requests and corresponding responses filtered by the fuzzy sampler 214. For example, the encoder 212 encodes the response A 226 in a header of the request A 224. The encoder 212 encodes responses from the service application 122 into corresponding request headers. The following illustrates examples of encoded headers:

trpResH: response header encoded.
trpResB: response body encoded.
trpCustom: allows extensible source to encode additional data.

The async relay circuit 218 forwards the encoded request A 228 to the pre-production application servers 132 (also referred to as a shadow production box that is hidden from the client device 106). In one example embodiment, the async relay circuit 218 relays http or other types of network requests to the service application 216. In one example, the async relay circuit 218 maintains quality of service of the original service (e.g., service application 122) by dropping messages (e.g., not mirroring those messages to the pre-production application servers 132). This is to prevent impact on the original production service latency/throughput/congestion due to shared IO/memory. In another example embodiment, if the async relay circuit 218 determines that an error rate crosses an error threshold, the async relay circuit 218 disconnects from the pre-production application servers 132 to prevent degradation of the original service of the service application 122.

In another example embodiment, the async relay circuit 218 forwards the encoded request A 228 to multiples application servers (not shown) where each application server includes a different version of the service application 122. As such, multiple versions of the service application 122 can be tested simultaneously.

The pre-production application servers 132 receives the encoded request A 228. In one example embodiment, the pre-production application servers 132 includes an application server 222 that comprises a traffic proxy 202 and a service application 216. The service application 216 includes a different version (e.g., updated version) of the service application 122.

The traffic proxy 202 includes a decoder 206, a dynamic transform runtime 204, a fuzzy sampler 208, and an async relay circuit 210. The decoder 206 decodes the encoded request A 228 to retrieve the request A 224 and the response A 226. After the decoder 206 decodes the encoded request A 228, the traffic proxy 202 provides the request A 224 to the service application 216. The service application 216 generates a response B 230 in response to the request A 224.

The dynamic transform runtime 204 transforms responses from original/new services (e.g., response A 226 from service application 122, response B 230 from service application 216) to render them comparable. The dynamic transform runtime 204 allows dynamic configuration at runtime of which differences are to be analyzed. Differences between the responses are formatted in patterns friendly to analytics platforms. For example, the dynamic transform runtime 204 may embed JavaScript runtime inside java virtual machine and allows dynamic programming scripting (that can be altered at real time). The following is an example of a programming of the dynamic transform runtime 204:

```
function transform(oldformatResA,oldformatResB) {
var newFormat = [];
oldFormat=oldFormat.data;
for (var i=0; i<oldFormat.length; i++) {
newFormat.push([oldFormat[i].id], oldFormat[i].name);
};
return {
aaData: newFormat
};
}
```

The fuzzy sampler 208 samples differences between the response A 226 and the response B 230 after the dynamic transform runtime 204 analysis.

The async relay circuit 210 forwards the sampled differences 232 to the monitoring tool 220 (e.g., analysis software tool operating on a computing device). Notably, the async relay circuit 210 may forward results asynchronously. A technical effect of asynchronous forwarding is that performance of the traffic proxy 202 will not be degraded as results may be forwarded on a secondary thread.

FIG. 3 is a table 300 of examples of regex condition template 302 and corresponding descriptions 304. For example, a regex condition of \REQ_B\{regex} corresponds to filtering based on content from a request body. The \{regex} allows for extensible custom declaration of data source. For example, \SYS\{regex} is for pulling in CPU/Memory usage and sampling only when a threshold is met.

Figure 4:
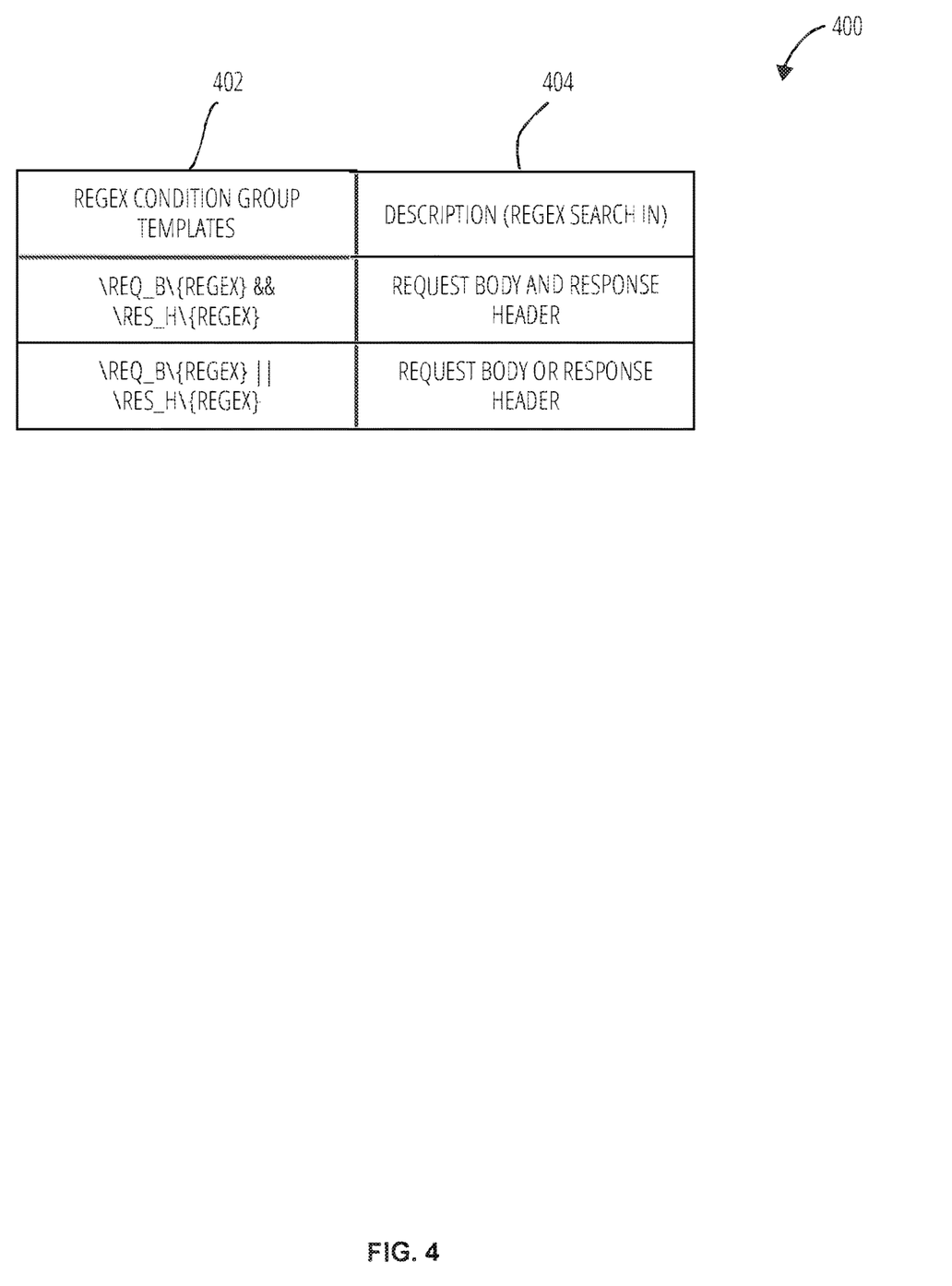
FIG. 4 illustrates a table 400 in accordance with one embodiment.

FIG. 4 is a table 400 of examples of regex condition group templates 402 and corresponding description 404. For example, the condition \REQ_B\{regex} && \RES_H\{regex} indicates that all regex conditions need to evaluate to true.

Figure 5:
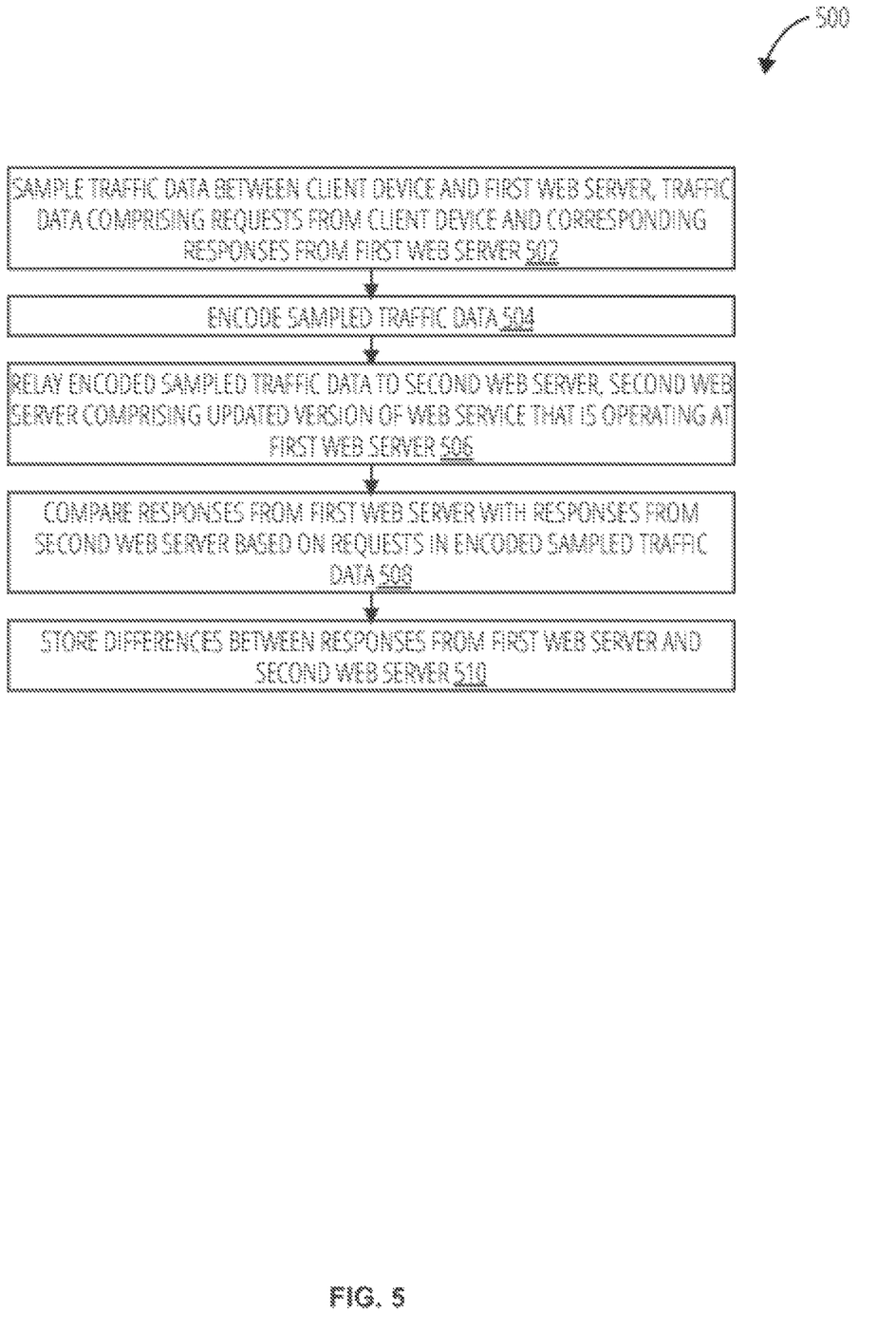
FIG. 5 illustrates a routine in accordance with one embodiment.

FIG. 5 is a flow diagram illustrating a method 500 for mirroring traffic data, in accordance with an example embodiment. Operations in the method 500 may be performed by the traffic proxy 124, using components (e.g., modules, engines) described above with respect to FIG. 2. Accordingly, the method 500 is described by way of example with reference to the traffic proxy 124. However, it shall be appreciated that at least some of the operations of the method 500 may be deployed on various other hardware configurations or be performed by similar components residing elsewhere. For example, some of the operations may be performed by other components of the live production application servers 104.

In block 502, method 500 samples traffic data between a client device and a first web server, the traffic data comprising requests from the client device and corresponding responses from the first web server. In block 504, method 500 encodes the sampled traffic data. In block 506, method 500 relays the encoded sampled traffic data to a second web server, the second web server comprising an updated version of a web service that is operating at the first web server. In block 508, method 500 compares responses from the first web server with responses from the second web server based on the requests in the encoded sampled traffic data. In block 510, method 500 stores differences between the responses from the first web server and the second web server.

Figure 6:
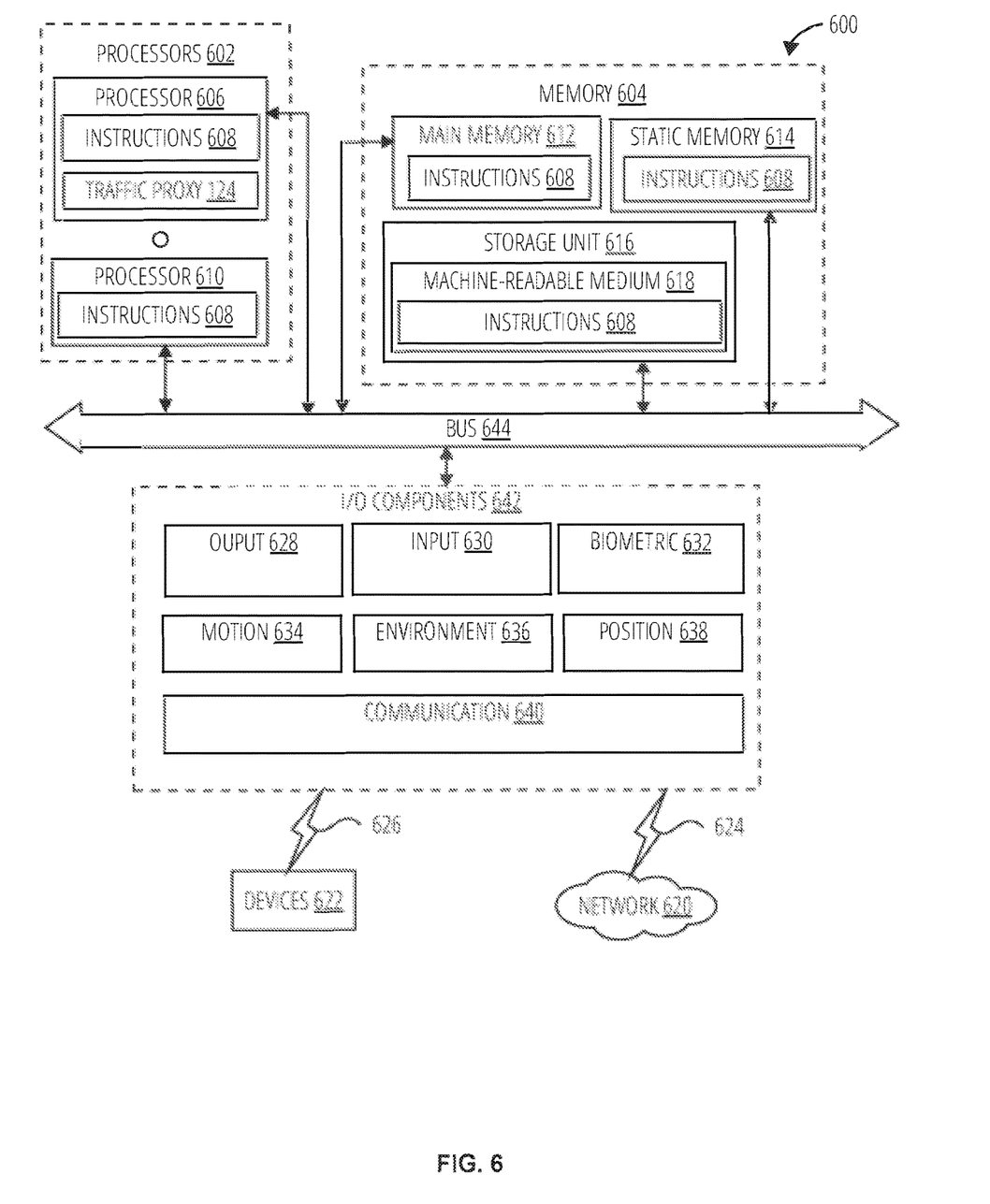
FIG. 6 is a diagrammatic representation of a machine in the form of a computer system within which a set of instructions may be executed for causing the machine to perform any one or more of the methodologies discussed herein, according to an example embodiment.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein.

The machine 600 may include processors 602, memory 604, and I/O components 642, which may be configured to communicate with each other via a bus 644. In an example embodiment, the processors 602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single core, a single processor with multiple cores (e.g., a multi-core processor), multiple processors with a single core, multiple processors with multiples cores, or any combination thereof. In one example embodiment, the processor 606 executes instructions related to the traffic proxy 124.

The memory 604 includes a main memory 612, a static memory 614, and a storage unit 616, both accessible to the processors 602 via the bus 644. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the processor's cache memory), or any suitable combination thereof, during execution thereof by the machine 600.

The I/O components 642 may include a wide variety of components to receive input, provide output, produce output, transmit information, exchange information, capture measurements, and so on. The specific I/O components 642 that are included in a particular machine will depend on the type of machine. For example, portable machines such as mobile phones may include a touch input device or other such input mechanisms, while a headless server machine will likely not include such a touch input device. It will be appreciated that the I/O components 642 may include many other components that are not shown in FIG. 6. In various example embodiments, the I/O components 642 may include output components 628 and input components 630. The output components 628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 642 may include biometric components 632, motion components 634, environmental components 636, or position components 638, among a wide array of other components. For example, the biometric components 632 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 634 include acceleration sensor components (e.g., accelerometer), gravitation sensor components, rotation sensor components (e.g., gyroscope), and so forth. The environmental components 636 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 638 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 642 further include communication components 640 operable to couple the machine 600 to a network 620 or devices 622 via a coupling 624 and a coupling 626, respectively. For example, the communication components 640 may include a network interface component or another suitable device to interface with the network 620. In further examples, the communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as location via Internet Protocol (IP) geolocation, location via Wi-Fi® signal triangulation, location via detecting an NFC beacon signal that may indicate a particular location, and so forth.

The various memories (e.g., memory 604, main memory 612, static memory 614, and/or memory of the processors 602) and/or storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed embodiments.

The instructions 608 may be transmitted or received over the network 620, using a transmission medium, via a network interface device (e.g., a network interface component included in the communication components 640) and using any one of a number of well-known transfer protocols (e.g., hypertext transfer protocol (HTTP)). Similarly, the instructions 608 may be transmitted or received using a transmission medium via the coupling 626 (e.g., a peer-to-peer coupling) to the devices 622.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a computer-implemented method. The method comprises: sampling traffic data between a client device and a first web server, the traffic data comprising requests from the client device and corresponding responses from the first web server; encoding the sampled traffic data; relaying the encoded sampled traffic data to a second web server, the second web server comprising an updated version of a web service that is operating at the first web server; comparing responses from the first web server with responses from the second web server based on the requests in the encoded sampled traffic data; and storing differences between the responses from the first web server and the second web server.

In example 2, the subject matter of example 1 can optionally include: decoding the encoded sampled traffic data; dynamically transforming the responses from the decoded sampled traffic data to a format compatible with the responses from the second web server; and comparing the transformed responses from the first web server with responses from the second web server.

In example 3, the subject matter of example 3 can optionally include: wherein encoding the sampled traffic data further comprises: encoding a first response from the first web server in a header of a corresponding first request from the client device.

In example 4, the subject matter of example 3 can optionally include: extracting the first response encoded in the header of the corresponding first request; forwarding the first request to the second web server; receiving a second response from the second web server in response to the first request; and comparing the first response with the second response.

In example 5, the subject matter of example 1 can optionally include: sampling responses from the second web server; and comparing the sampled responses from the second web server with corresponding responses from the first web server.

In example 6, the subject matter of example 1 optionally include: detecting differences between the responses from the first web server and the second web server; and in response to detecting the differences, automatically sending an alert based on the differences.

In example 7, the subject matter of example 1 can optionally include: intercepting requests from the client device to the first web server; forwarding the requests to the first web server; receiving the corresponding responses from the first web server; and forwarding the corresponding responses to the client device.

In example 8, the subject matter of example 7 can optionally include: selecting a subset of the requests; and selecting the responses corresponding to the subset of the requests.

In example 9, the subject matter of example 7 can optionally include: determining an error rate based on differences between the responses from the first web server and the second web server; determining that the error rate exceeds an error threshold; and in response to determining that the error rate exceeds the error threshold, disabling the intercepting from the client device to the first web server.

In example 10, the subject matter of example 1 can optionally include: accessing a filter based on at least of one of a request body, a request header, a request Uniform Resource Locator, a response body, a response header, and a response time; and sampling the traffic data based on the filter.

What is claimed is:

1. A computer-implemented method comprising:
    sampling traffic data between a client device and a first web server operating a first version of a service in a first environment, the traffic data comprising requests from the client device and corresponding responses from the first web server, the sampling of the traffic data based on a proxy configured to filter corresponding responses of interest, the proxy accessible based on a response time;
    encoding the sampled traffic data;
    relaying the encoded sampled traffic data to a second web server operating a second version of the service in a second environment;
    comparing the responses from the first web server with responses from the second web server based on the requests from the client device in the encoded sampled traffic data; and
    based on the comparing, storing differences between the responses from the first web server and the responses from the second web server.

2. The computer-implemented method of claim 1, further comprising:
    decoding the encoded sampled traffic data;
    dynamically transforming the responses from the first web server from the decoded sampled traffic data to a format compatible with the responses from the second web server; and
    comparing transformed responses from the first web server with the responses from the second web server.

3. The computer-implemented method of claim 1, wherein encoding the sampled traffic data further comprises encoding a first response from the first web server in a header of a corresponding first request from the client device.

4. The computer-implemented method of claim 3, further comprising:
extracting the first response encoded in the header of the corresponding first request;
forwarding the first request to the second web server;
receiving a second response from the second web server in response to the first request; and
comparing the first response with the second response.

5. The computer-implemented method of claim 1, further comprising:
sampling the responses from the second web server; and
comparing the sampled responses from the second web server with the corresponding responses from the first web server.

6. The computer-implemented method of claim 1, further comprising:
detecting the differences between the responses from the first web server and the responses from the second web server; and
in response to detecting the differences, automatically sending an alert based on the differences.

7. The computer-implemented method of claim 1, further comprising:
determining an error rate based on the differences between the responses from the first web server and the responses from the second web server;
determining that the error rate exceeds an error threshold; and
in response to determining that the error rate exceeds the error threshold, disconnecting the first web server from the second web server.

8. The computer-implemented method of claim 1, further comprising:
simultaneously relaying the encoded sampled traffic data to a third web server operating a third version of the service in a third environment;
comparing the responses from the first web server with responses from the third web server based on the requests from the client device in the encoded sampled traffic data; and
based on the comparing, storing differences between the responses from the first web server and the responses from the third web server.

9. A computing system comprising:
a processor; and
a memory storing instructions that, when executed by the processor, configure the computing system to:
sample traffic data between a client device and a first web server operating a first version of a service in a first environment, the traffic data comprising requests from the client device and corresponding responses from the first web server, the sampling of the traffic data based on a proxy configured to filter corresponding responses of interest, the proxy accessible based on a response time;
encode the sampled traffic data;
relay the encoded sampled traffic data to a second web server operating a second version of the service in a second environment;
compare the responses from the first web server with responses from the second web server based on the requests from the client device in the encoded sampled traffic data; and
based on the responses compared, store differences between the responses from the first web server and the responses from the second web server.

10. The computing system of claim 9, wherein the instructions further configure the system to:
decode the encoded sampled traffic data;
dynamically transform the responses from the first web server from the decoded sampled traffic data to a format compatible with the responses from the second web server; and
compare the transformed responses of the responses from the first web server with the responses from the second web server.

11. The computing system of claim 9, wherein the instructions further configure the system to:
extract the first response encoded in a header of the corresponding first request;
forward the first request to the second web server;
receive a second response from the second web server in response to the first request; and
compare the first response with the second response.

12. The computing system of claim 9, wherein the instructions further configure the system to:
detect the differences between the responses from the first web server and the responses from the second web server; and
in response to detecting the differences, automatically send an alert based on the differences.

13. The computing system of claim 9, wherein the instructions further configure the system to:
determine an error rate based on the differences between the responses from the first web server and the responses from the second web server;
determine that the error rate exceeds an error threshold; and
in response to determining that the error rate exceeds the error threshold, disconnect the first web server from the second web server.

14. A computer-implemented method comprising:
sampling traffic data between a client device and a first web server operating a first version of a service in a first environment, the traffic data comprising requests from the client device and corresponding responses from the first web server, the sampling of the traffic data based on a proxy configured to filter corresponding responses of interest, the proxy accessible based on a response time;
encoding the sampled traffic data;
relaying the encoded sampled traffic data to a plurality of different web servers, each different web server of the plurality of different web servers operating a second version of the service;
comparing the responses from the first web server with responses from the plurality of different web servers based on the requests from the client device in the encoded sampled traffic data; and
based on the comparing, storing differences between the responses from the first web server and the responses from the plurality of different web servers.

15. The computer-implemented method of claim 14, further comprising:
simultaneously relaying the encoded sampled traffic data to a third web server operating a third version of the service in a third environment;
comparing the responses from the first web server with responses from the third web server based on the requests from the client device in the encoded sampled traffic data; and based on the comparing, storing differences between responses from the first web server and the responses from the third web server.

16. The computer-implemented method of claim 14, further comprising sending an alert based on the differences stored.

17. The computer-implemented method of claim 14, wherein the proxy is configured to filter the corresponding responses of interest based on a request body and a response header.

18. The computer-implemented method of claim 14, wherein the proxy is further configured to filter based on regex pattern matching.

19. The computer-implemented method of claim 14, wherein the proxy includes a fuzzy sampler, an encoder, and an async relay circuit.

20. The computer-implemented method of claim 14, wherein the encoding of the sampled traffic data further comprises encoding a first response from the first web server in a header of a corresponding first request from the client device.

* * * * *